United States Patent [19]
Kubo et al.

[11] Patent Number: 4,838,712
[45] Date of Patent: Jun. 13, 1989

[54] BALL BEARING AND THE RETAINER THEREOF

[75] Inventors: Mutsuo Kubo, Hatano; Yoshiaki Katsuno, Fujisawa, both of Japan

[73] Assignee: Nippon Seiko Kabushiki Kaisha, Tokyo, Japan

[21] Appl. No.: 106,029

[22] Filed: Oct. 8, 1987

Related U.S. Application Data

[63] Continuation of Ser. No. 877,802, Jun. 24, 1986, abandoned.

[30] Foreign Application Priority Data

Jun. 28, 1985 [JP] Japan ............................. 60-97701[U]

[51] Int. Cl.$^4$ ............................................. F16C 33/38
[52] U.S. Cl. ................................................. 384/523
[58] Field of Search ............... 384/526, 527, 534, 528, 384/529, 523

[56] References Cited

U.S. PATENT DOCUMENTS 3,027,626  4/1962  Murphy ................. 384/527
3,399,936  9/1968  Vannest ................ 384/528
4,169,636 10/1979  Hooper ................. 384/527

Primary Examiner—Lenard A. Footland
Attorney, Agent, or Firm—Shapiro and Shapiro

[57] ABSTRACT

An annular ball retainer for a ball bearing having a plurality of balls disposed in an annular space between an inner race and an outer race comprises radially extending cylindrical wall portions defining holes for retaining the balls therein, and restraining portions extending into the holes in circumferentially opposed relationship with each other in the radial end portions of the cylindrical wall portion and supporting the circumferentially fore and rear portions of the balls. A ball bearing has a plurality of balls retained between the inner race and the outer race by the ball retainer.

11 Claims, 2 Drawing Sheets

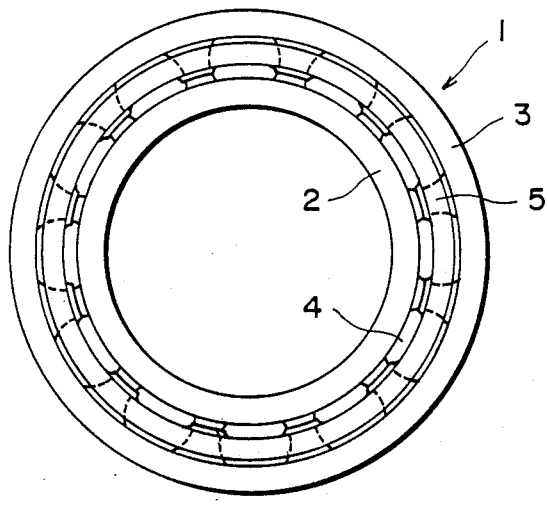
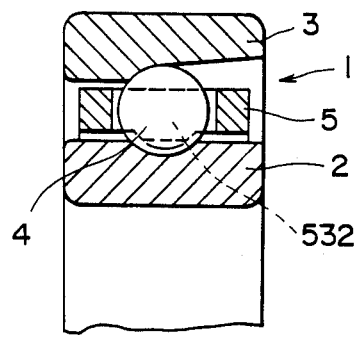
FIG. 1  FIG. 2
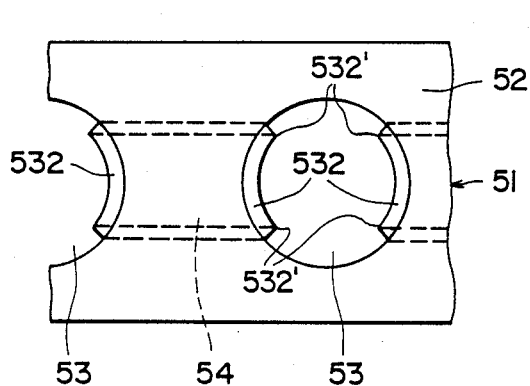
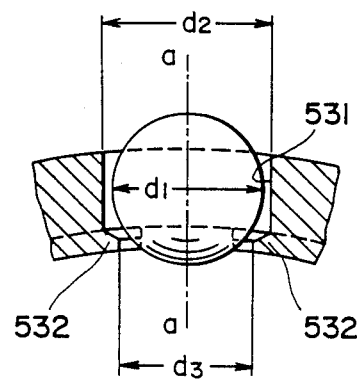
FIG. 3  FIG. 4

BALL BEARING AND THE RETAINER THEREOF

This is a continuation application of Ser. No. 877,802 filed June 24, 1986, now abandoned.

BACKGROUND OF THE INVENTION

1. Field of the Invention

This invention relates to a ball bearing of the type in which a retainer is guided by balls and in which the amount of radial movement during rotation is controlled, and to the retainer of such a bearing.

2. Related Background Art

An example of the conventional ball guide type retainer is shown in FIGS. 6 and 7 of the accompanying drawings. The peripheral wall of a retainer body 1a is provided with a plurality of pocket holes 3a having a diameter slightly greater than the diameter of balls 2a, each pocket having a peripheral wall 21a along (parallel to) the radial center line. The inner peripheral edge portion (or sometimes the outer peripheral edge portion) of each of the pocket holes is provided with restraining portions 4a for contacting the balls 2a during the rotation of the bearing to control the amount of radial movement of the retainer itself and to permit the retainer to rotate without contacting an inner race (or an outer race).

In the above-described conventional retainer, however, the restraining portions 4a are formed continuously along the entire periphery of each pocket hole 3a and therefore have points of contact with the balls 2a around the entire pocket hole periphery. This has led to problems such as heat generation and abrasion resulting from friction. Also, because it is difficult to precisely work the shape of the restraining portions, contact of the restraining portions 4a with the balls 2a may be non-uniform and unstable due to slight errors of dimensions and shape. These factors lead to collision noise between the retainer and the balls (so-called retainer noise) and/or heat generation.

SUMMARY OF THE INVENTION

It is an object of the present invention to provide a ball bearing which does not cause retainer noise or heat generation and which can perform a stable bearing action.

It is another object of the present invention to provide a retainer which can stably guide the balls of a ball bearing.

The ball bearing according to the present invention comprises an outer race and an inner race defining an annular space therebetween, a plurality of balls disposed in the space, and an annular retainer having holes for retaining the balls at predetermined intervals, each of the holes comprising a cylindrical wall portion extending radially of the retainer, and restraining portions extending in circumferentially opposed relationship with each other from the radial end portions of the wall portion and supporting the circumferentially fore and rear portions of the balls.

The retainer according to the present invention has a radially extending cylindrical wall portion defining holes for retaining balls therein, and restraining portions extending into the holes in circumferentially opposed relationship with each other in the radial end portions of the cylindrical wall portion supporting the circumferentially fore and rear portions of the balls.

BRIEF DESCRIPTION OF THE DRAWINGS

FIGS. 1 to 5 show embodiments of the present invention, FIG. 1 being a general view of the ball bearing of the present invention, FIG. 2 being a cross-sectional view of the principal portions of a first embodiment of the retainer of the present invention, FIG. 3 being a fragmentary developed view of the FIG. 2 retainer as seen from the outer diameter side thereof, FIG. 4 being a cross-sectional view showing the shape of a pocket hole in the radial direction thereof, and FIG. 5 being a fragmentary developed view showing a second embodiment of the retainer.

DESCRIPTION OF THE PREFERRED EMBODIMENTS

Figure 5:
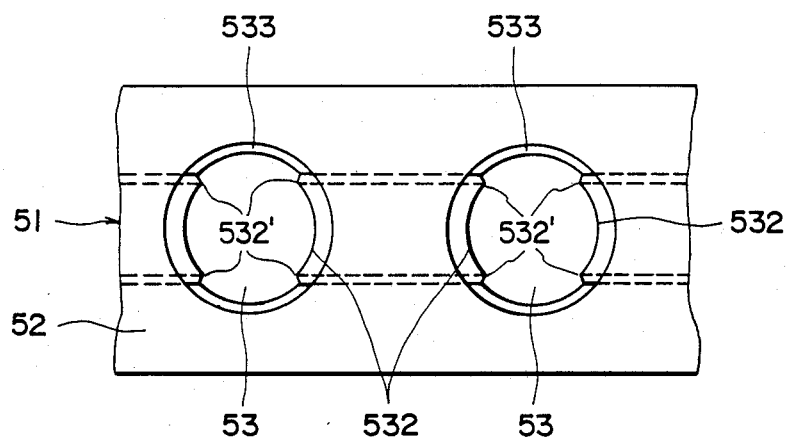

FIGS. 1 to 4 show a bearing according to the present invention and a first embodiment of the retainer thereof, and FIG. 5 shows a second embodiment of the retainer.

In these Figures, reference numeral 1 designates a ball bearing generally. Reference numeral 2 denotes an inner race, reference numeral 3 designates an outer race, reference numeral 4 denote balls, and reference numeral 5 designates a retainer. Reference numeral 51 denotes a retainer body, reference numeral 52 designates a peripheral wall, reference numeral 53 denotes pocket holes, and reference numeral 54 designates convex portions.

The ball bearing 1 comprises the annular inner race 2 and outer racd 3, and a plurality of balls 4 retained between the two races by the retainer 5. The balls 4 are inserted and retained in the pocket holes 53 provided in the peripheral surface of the retainer 5.

The embodiment shown in FIGS. 1 to 4 will now be described.

The retainer 5 is in the form of an annular belt having a plurality (a required number) of pocket holes 53 each having a diameter d2 slightly greater than the diameter d1 of the balls 4, as shown in FIG. 4. The pocket holes are disposed circumferentially at predetermined intervals in the peripheral wall 52 of the retainer body 51, which may be made of a metal. The pocket holes 53 are straight holes, each having a peripheral wall 531 parallel to a radial center line a—a passing through the center of the retainer 51. In accordance with the invention, a pair of restraining portions 532 partly protruding toward the inside of the pocket hole 53 are formed on the inner periphery of each pocket hole. The distance d3 between the restraining portions 532 is smaller than the diameter d1 of the balls 4.

Also, the two restraining portions 532 formed in each of the pocket holes 53 are formed in opposed relationship with each other at the circumferentially fore and rear positions of the retainer in each of the pocket holes 53. Thus, each portion 532 has ends 532' disposed toward either axial end of the retainer (i.e., toward the opposite sides of the retainer), and the ends of each portion 532 are spaced circumferentially of the corresponding through hole from the ends of the opposing portion 532 of the same through hole. Moreover, the two adjacent restraining portions 532 of the pocket holes 53 adjacent to each other are formed in a connected band-like shape for convenience of molding. That is, the belt-like convex portion 54 protruding radially inwardly (protruding from the inner peripheral surface of the peripheral wall) and extending circumferentially is formed between the pocket holes, and the opposite end portions thereof constitute the restraining portions 532 of each pocket hole.

FIG. 5 shows the second embodiment. A protruded portion 533 is provided on the marginal portion of each of pocket holes 53 at the inner periphery side of the peripheral wall 52 of the retainer body. The protruded portion 533 has an inner surface in the pocket hole 53 tapering inward of the pocket hole from the marginal portion of the straight pocket hole wall. The restraining portions 532 are formed at symmetrical locations to the outside of the protruded portion 533 spaced circumferentially of the retainer.

Which of the above-described two embodiments should be adopted in a given case will depend on the type and dimensions of the bearing and the gap provided between the peripheral surface of the retainer and the peripheral surface of the ball race.

As described above, the restraining portions, which contact the balls during the rotation of the bearing to control the amount of radial movement of the retainer itself, are partially formed in opposed relationship with each other at the fore and rear locations in each pocket hole circumferentially of the retainer. Accordingly, in contrast to the conventional structure in which a restraining portion is formed over the entire periphery of the pocket hole such that the entire periphery of the marginal portion thereof contacts a ball, each restraining portion of the present invention contacts a ball only along a portion of the pocket hole circumference. Thus, friction is reduced. Also, the ball bearing of the present invention is not sensitively affected by slight errors of shape and dimensions and therefore, the state of contact is stabilized and production of retainer noise and heat generation is suppressed so that the rotational performance is improved.

If the restraining portions are formed axially of the retainer, there will be the possibility of oil film cut occurring due to the edge striking of the restraining portions during rotation. In the present invention, the restraining portions are provided circumferentially so there is no possibility of edge striking or oil film cut. This ensures excellent rotational performance, and the bearing of the present invention can thus stand even long-period use. Further, the working of the restraining portions is easy. Accordingly, as compared with the conventional retainers, the retainer of the present invention is effective as a retainer for a bearing of higher accuracy and higher rotational speed.

Figure 6:
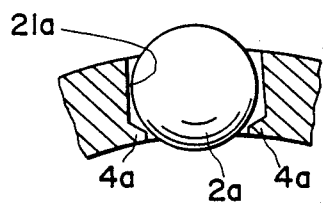
FIGS. 6 and 7 show the shape of the pocket holes of the conventional retainer, FIG. 6 being a fragmentary cross-sectional view, and FIG. 7 being a fragmentary developed view.
Figure 7:
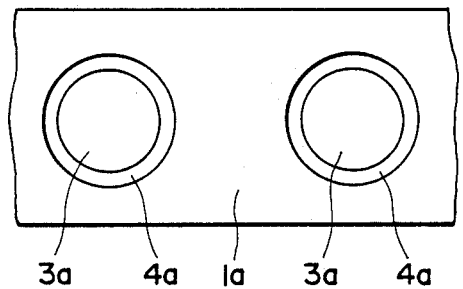

In the above-described embodiments, the retainer has been shown as being made of a metal, but alternatively, it may be made of a resin material. The present invention is particularly effective in a case where the retainer is injection-molded by the use of thermoplastic resin.

Where the retainer as described above is injection-molded by the use of thermoplastic resin, it is difficult to make the pocket holes circular in a plane because thermoplastic resin differs in contraction coefficient between the circumferential direction and the axial direction. Generally, if the retainer as shown in FIGS. 6 and 7 is injection-molded by the use of thermoplastic resin, the pocket holes will take an elliptical shape having a major axis in the circumferential direction. If in such a case, a structure is adopted in which restraining portions are provided at circumferentially fore and rear locations, as in the present invention, the balls will be supported at four points of the opposite ends of each restraining portion, and stable ball retention will become possible. Accordingly, it will be unnecessary for the entire circumference to maintain a predetermined distance relative to the balls, and therefore, the bearing will be affected less by errors of dimensions and shape.

It will be understood that the illustrated embodiments are merely typical examples of the present invention and that the present invention can be carried out with parts thereof being suitably changed within the scope of the invention as defined in the appended claims.

Further, in the illustrated embodiments, the restraining portions are formed on the inner periphery side of the retainer body, but depending on the type of the bearing, they may be provided on the outer periphery side of the retainer body.

We claim:

1. A ball bearing comprising:
   an outer race and an inner race defining an annular space therebetween,
   a plurality of balls disposed in said annular space in rolling engagement with said outer race and said inner race, and
   a retainer ring disposed in said annular space and having a plurality of circumferentially spaced through holes extending substantially radially of said ring each retaining a corresponding one of said balls therein,
   each through hole having, only near an open inner end thereof, restraining protrusion means for guiding said retainer ring in said annular space by engagement with the corresponding ball as said inner race and said outer race rotate relative to one another, said restraining protrusion means including two discrete restraining protrusions which are disposed at opposite sides of said through hole relative to the circumferential direction of said retaining ring and which project generally radially inward of said through hole, said two protrusions each having respective ends disposed toward either axial end of said retaining ring and spaced circumferentially of said through hole from the ends of the other of said two protrusions, said two protrusions being positioned in engagement at their respective ends with opposite sides of the corresponding ball retained in said through hole so as to effect four-point support of the ball.

2. A ball bearing according to claim 1, wherein said retainer ring is formed of a resin material.

3. A ball bearing according to claim 2, wherein said resin material is thermoplastic resin.

4. A ball bearing according to claim 1, wherein adjacent restraining protrusions of circumferentially adjacent through holes are formed integrally with one another.

5. A ball bearing according to claim 4, wherein said adjacent restraining protrusions are formed at opposite ends of a belt-like convex portion protruding radially inwardly from an inner peripheral surface of said retainer ring.

6. A ball retainer for a ball bearing having balls disposed in an annular space between an inner race and an outer race and in rolling contact with the inner and outer races, said retainer comprising a retainer ring having a plurality of circumferentially spaced through holes extending substantially radially of the ring each for retaining therein a corresponding one of the balls of the bearing, each through hole having, only near an open inner end thereof, restraining protrusion means for guiding said retainer ring in the annular space by engagement with the corresponding ball as the inner race and outer race of the bearing rotate relative to one another, said restraining protrusion means including two discrete restraining protrusions which are disposed at opposite sides of said through hole relative to the circumferential direction of said ring and which project generally radially inward of said through hole, said two protrusions each having respective ends disposed toward either axial end of said ring and spaced circumferentially of said through hole from the ends of the other of said two protrusions, said two protrusions being positioned and shaped such that they will engage opposite sides of the corresponding ball at their respective ends so as to effect four-point support of the ball as the inner race and outer race of the bearing rotate relative to one another.

7. A ball retainer according to claim 6, wherein said retainer ring is formed of a resin material.

8. A ball retainer according to claim 7, wherein said resin material is thermoplastic resin.

9. A ball retainer according to claim 6, wherein adjacent restraining protrusions of circumferentially adjacent through holes are formed integrally with one another.

10. A ball retainer according to claim 9 wherein said adjacent restraining protrusions are formed at opposite ends of a belt-like convex portion protruding radially inwardly from an inner peripheral surface of said retainer ring.

11. A ball retainer according to claim 6 wherein each said through hole has an inwardly protruding tapered portion extending circumferentially thereof and connecting said two restraining protrusions together.

* * * * *